(12) United States Patent
Wang et al.

(10) Patent No.: US 11,919,067 B1
(45) Date of Patent: Mar. 5, 2024

(54) SAND CORE STRUCTURE FOR DIE-CASTING

(71) Applicant: XIAMEN JJD MACHINERY CO., LTD., Fujian (CN)

(72) Inventors: Hualan Wang, Fujian (CN); Jialin Wang, Fujian (CN); Xinchao Tang, Fujian (CN)

(73) Assignee: XIAMEN JJD MACHINERY CO., LTD., Fujian (CN)

( * ) Notice: Subject to any disclaimer, the term of this patent is extended or adjusted under 35 U.S.C. 154(b) by 0 days.

(21) Appl. No.: 18/228,711

(22) Filed: Aug. 1, 2023

(30) Foreign Application Priority Data

Jun. 10, 2023 (CN) .......................... 202310686267.X

(51) Int. Cl.
*B22C 9/10* (2006.01)

(52) U.S. Cl.
CPC ...................... *B22C 9/10* (2013.01)

(58) Field of Classification Search
CPC ............ B22C 9/10; B22C 9/103; B22C 9/106

USPC ................. 164/365, 366, 367, 369
See application file for complete search history.

(56) References Cited

U.S. PATENT DOCUMENTS

| | | | | |
|---|---|---|---|---|
| 1,512,996 | A | * | 10/1924 | Moldenke ................. B22C 9/00 164/410 |
| 3,142,875 | A | * | 8/1964 | Lirones et al. ......... B22C 9/106 164/32 |
| 4,712,600 | A | * | 12/1987 | Hamajima et al. ......................... B22D 19/0027 164/120 |
| 4,981,168 | A | * | 1/1991 | Koch et al. ............... B22C 9/10 164/369 |
| 6,478,073 | B1 | * | 11/2002 | Grebe et al. ......... B22D 29/002 164/369 |

* cited by examiner

*Primary Examiner* — Kevin P Kerns
(74) *Attorney, Agent, or Firm* — Cooper Legal Group, LLC

(57) ABSTRACT

A sand core structure for die-casting includes a positioning-filling rod and a sand core body configured to encompass the positioning-filling rod. The positioning-filling rod has a compressive strength greater than a compressive strength of the sand core body, and the positioning-filling rod is made of a breathable material.

4 Claims, 8 Drawing Sheets

A　　　　　　　　　　　　B

SAND CORE STRUCTURE FOR DIE-CASTING

CROSS-REFERENCE TO RELATED APPLICATION

This application claims priority to Chinese patent application No. 202310686267.X, filed on Jun. 10, 2023. The entirety of Chinese patent application No. 202310686267.X is hereby incorporated by reference herein and made a part of this specification.

FIELD OF THE INVENTION

The present application relates to the field of die-casting technology, in particular, to a sand core structure for die-casting.

DESCRIPTION OF RELATED ART

With the development of mechanical equipment towards lightweight and high-performance, the structure of aluminum alloy casting parts as equipment components becomes increasingly complex, and the requirements for the quality and safety performance of casting parts in the industrial chain are also significantly increased. For casting parts with complex internal structures or inverted buckles, an investment casting method is generally adopted by enterprises, in which salt cores and sand cores are used to assist the casting process. Casting parts formed by this casting process usually have disadvantages such as low surface finish, low dimensional accuracy, low surface hardness, and being not suitable for thin-walled workpieces.

Casting parts formed by a die-casting process can effectively overcome the aforementioned drawbacks of the casting parts. In the die-casting process, the mold filling process is completed in a very short period, such that gas entrapment easily exists and the quality of the die-casting parts is affected. The sand core used in the die-casting process also requires high strength. During the mold filling process of die-casting, the sand core has to withstand the impact of high-speed and high-pressure molten metal. For the preparation of workpieces with a wall thickness of less than 3 mm at some portion and workpieces with non-uniform thickness, a pressurized die-casting process is needed. However, sand core cracking phenomenon, as shown in FIG. 1, is often present in the pressurized die-casting technology, resulting in a low yield of the die-casting parts, mainly due to poor filling, internal porosity in die-casting parts, and substandard wall thickness of the die-casting parts.

BRIEF SUMMARY OF THE INVENTION

In order to improve the yield of the die-casting parts, the present application provides a sand core structure for die-casting, die-casting mold, and die-casting molding process, from the perspective of improving the sand core and die-casting molding process, and adopts the following technical solution.

In a first aspect, the present application provides a sand core structure for die-casting and adopts the following technical solution.

A sand core structure for die-casting, including a positioning-filling rod and a sand core body configured to encompass the positioning-filling rod, in which the positioning-filling rod has a compressive strength greater than a compressive strength of the sand core body, and the positioning-filling rod is made of a breathable material.

In the above technical solution, a breathable and high-strength positioning-filling rod is inserted in the sand core body, which improves the compressive strength of the sand core, reduces internal cracking and deformation problems of the sand core, helps to solve problems such as poor filling, cold shut, internal pores, slag holes, and substandard wall thickness of the die-casting parts, and improves the yield of the die-casting parts.

In some embodiments, the positioning-filling rod is made of materials selected from a group consisting of solid breathable steel, hollow extruded sintered copper, and hollow breathable steel.

In the above technical solutions, these materials have high strength and strong breathability, which can meet the requirements of pressurized die-casting process, help solve the problem of internal cracking of sand cores and the problem of substandard wall thickness of die-casting parts, and improve the yield of the die-casting parts.

In some embodiments, the sand core body has a thickness of 10-20 mm at an end portion.

In the above technical solution, the sand core body with above thickness has both suitable breathability and strength, meeting the requirements for die-casting process. When the thickness is too large, the risk of internal cracking increases, and the compressive strength also decreases. When the thickness is too small, the protection to the positioning-filling rod is not enough, which is not conducive to the recycling of the positioning-filling rod after repeated usage.

In some embodiments, the sand core body has a thickness of 14-16 mm at the end portion. In the above technical solution, a sand core body with a thickness of 14-16 mm is more helpful in avoiding phenomena such as poor filling of the die-casting parts, internal porosity of the die-casting parts, substandard wall thickness of the die-casting parts, and cold shut, and in improving the yield of the die-casting parts.

In some embodiments, the positioning-filling rod is made of hollow breathable steel.

In some embodiments, the positioning-filling rod has a protruding end configured to protrude from the sand core body, and the protruding end is configured to be an inflation inlet for heptafluoropropane gas.

In the above technical solution, heptafluoropropane gas can be introduced through the inflation inlet, reducing the probability of oxidation of the die-casting parts. The positioning-filling rod made of breathable material is conducive to venting during die-casting process, reducing the probability of defects such as pores in the die-casting parts.

In some embodiments, the positioning-filling rod includes a first rod and a second rod, the sand core body includes a first core body and a second core body, the second core body has an integrally formed main stem portion and a branch portion, the first rod runs through the first core body and the main stem portion, the first core body is attached to the second core body, and the second rod is inserted in the branch portion.

In the above technical solution, multiple positioning-filling rods and multiple sand core bodies are arranged, such that the wall thickness of the special-shaped or branched sand core bodies can be selected within an appropriate range, and the sand core structure can have good breathability and high strength. This split-style structure design is conducive to the production of die-casting parts with branched structures.

In a second aspect, the present application provides a die-casting mold and adopts the following technical solution.

A die-casting mold includes the sand core structure for die-casting as described above, and further includes a mold base and an injection plunger. The mold base includes a feeding inlet, an injection chamber configured for accommodating metal liquid, a flow channel, a forming chamber, and a slag-gas outlet successively connected. One end of the flow channel connected to the forming chamber is configured to be an inner gate. The sand core structure is installed in the forming chamber. The injection plunger is movably embedded in the injection chamber.

In the above technical solution, compared to solid or hollow sand cores without positioning-filling rods, the yield of the die-casting parts prepared using this die-casting mold is significantly improved.

In a third aspect, the present application further provides a die-casting molding process and adopts the following technical solution.

A die-casting molding process adopts the die-casting mold as described above for die-casting. The die-casting molding process includes an initial stage, an injection chamber stage, an inner gate stage, a mold filling stage, and a compaction stage.

In the initial stage, a metal liquid is pushed by the injection plunger through the feeding inlet at a first speed of 0.06-0.10 m/s.

In the injection chamber stage, the metal liquid is pushed by the injection plunger to fill the injection chamber at a second speed of 0.12-0.18 m/s.

In the inner gate stage, the metal liquid is pushed by the injection plunger to fill the inner gate at a third speed of 0.16-0.28 m/s.

In the mold filling stage, the metal liquid is pushed by the injection plunger to fill the forming chamber at a fourth speed of 0.26-0.30 m/s.

In the compaction stage, when the metal liquid is poured into the slag-gas outlet, the injection plunger is activated to pressurize the metal liquid in the forming chamber, and filling metal liquid and cooling is performed.

In the above technical solution, different injection speeds in four stages are set during die-casting process, which helps to eliminate cavity bubbles, prevent gas entrapment, improve poor die-casting phenomena such as pores and cold shut, and improve the yield of the die-casting parts. The die-casting molding process is a pressurized die-casting process, by which workpieces with a wall thickness of less than 3 mm at some portion and workpieces with non-uniform thickness can be prepared. Due to the use of a sand core inserted with a positioning-filling rod, the sand core has strong resistance to high-speed and high-pressure impact of molten metal, the die-casting defects are significantly reduced, and the yield of the die-casting parts is improved. When the metal liquid is poured into the slag-gas outlet, it cools at the slag-gas outlet, and pressurization is initiated at this time. The metal liquid in the forming chamber still has good fluidity, and easily fills small spaces, such as small thickness spaces, so that the forming is good. If the pressurization is initiated too late, the metal liquid cools down and the fluidity decreases, which may result in insufficient filling of fine space. If the pressurization is initiated too early, the metal liquid tends to spray out of the slag-gas outlet, reducing the sealing performance of the forming chamber, and may also result in insufficient filling of fine space. Mold filling refers to filling fine parts of the forming chamber.

In some embodiments, the die-casting molding process further includes filling the positioning-filling rod with heptafluoropropane gas before the initial stage. The positioning-filling rod and the sand core body are filled with heptafluoropropane gas sequentially, and then the forming chamber is filled with heptafluoropropane gas.

In the above technical solution, the probability of oxidation of casting part is reduced and the surface smoothness of an inner cavity of the casting part is improved.

In some embodiments, the second speed is 0.14 m/s, the third speed is 0.18 m/s, and the fourth speed is 0.28 m/s.

In the above technical solution, the yield of the die-casting parts is higher than that of other die-casting parts prepared by using other speed solutions within above scopes.

In summary, the sand core structure, die-casting mold, and die-casting molding process provided in the present application can achieve at least one of the following beneficial effects:

The sand core structure is inserted with a breathable and high-strength positioning-filling rod in the sand core body, which improves the compressive strength of the sand core. When this sand core structure is applied in a die-casting mold, internal cracking and deformation problems of the sand core can be reduced. This sand core structure also helps to reduce defects such as poor filling, cold shut, internal pores, slag holes, and substandard wall thickness of the die-casting parts, improve the wall thickness accuracy of the die-casting parts, improve the surface smoothness of the inner cavity of the die-casting parts, and improve the yield of the die-casting parts.

In this die-casting molding process, different injection speeds in four stages are set, which helps to eliminate cavity bubbles, prevent gas entrapment, improve poor die-casting phenomena such as pores and cold shut, and improve the yield of the die-casting parts. The die-casting molding process is a pressurized die-casting process, by which workpieces with a wall thickness of less than 3 mm at some portion and workpieces with non-uniform thickness can be prepared. Due to the use of a sand core inserted with a positioning-filling rod, the sand core has strong resistance to high-speed and high-pressure impact of molten metal, the die-casting defects are significantly reduced, and the yield of the die-casting parts is improved.

DETAILED DESCRIPTION

The sand core structure, die-casting mold, and die-casting molding process of the present application will be described in detail by reference to the drawings hereinafter.

Example 1

Figure 1:
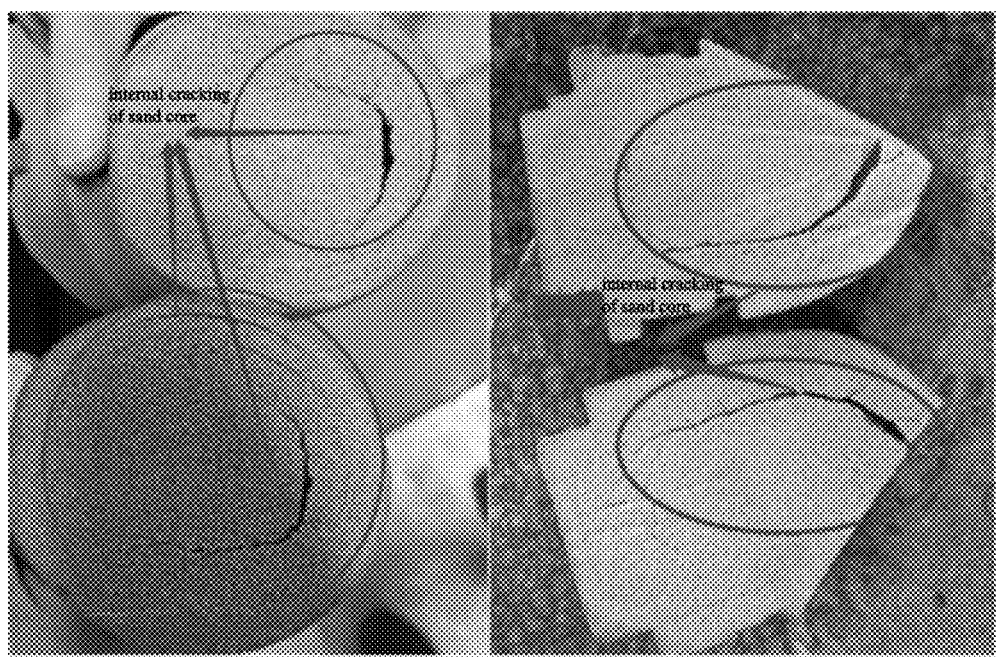
FIG. 1 is a schematic diagram of sand core cracking phenomenon described in the description of related art portion.
Figure 2:
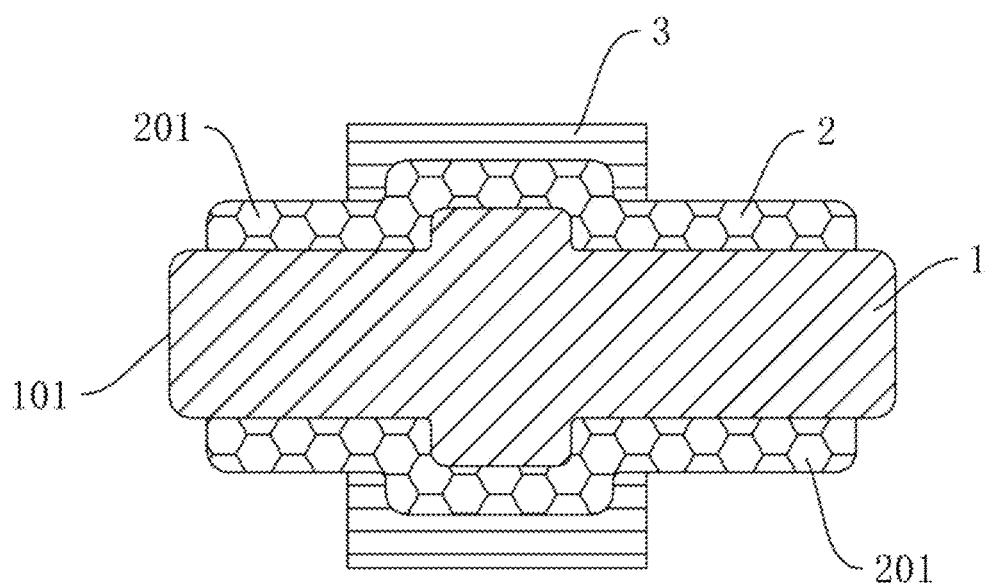
FIG. 2 is a cross-sectional view of a sand core structure for die-casting and die-casting part provided in Example 1.

As shown in FIG. 2, a sand core structure for die-casting includes a positioning-filling rod 1 and a sand core body 2 configured to encompass the positioning-filling rod 1. The preparation process of the sand core structure can includes attaching the sand core on the surface of the positioning-filling rod 1, extruding, and drying to obtain the sand core structure. The sand core body 2 is tightly attached to an outer surface of the positioning-filling rod 1.

The sand core body 2 is inserted with a positioning-filling rod 1, which reduces a thickness of the sand core, improves the compressive strength of the sand core, reduces internal cracking and deformation defects, and also helps to shorten a drying period of the sand core, achieving an effect of energy conservation and emission reduction. The use of this sand core structure for die-casting helps to solve problems such as poor filling, cold shut, internal pores, slag holes, and substandard wall thickness of the die-casting parts 3, and improve the yield of the die-casting parts 3. When the sand core structure is made into a hollow structure without a positioning-filling rod 1, although the permeability of the sand core is improved, the impact-resistance strength for metal liquid of the sand core is also significantly reduced, which cannot meet the requirements for die-casting, especially pressurized die-casting, and thin-walled parts cannot be produced.

The positioning-filling rod 1 can be made of solid breathable steel, solid sintered copper, solid gypsum, hollow extruded forged aluminum, hollow extruded sintered copper, hollow breathable steel, and other materials. These materials have high strength and can meet the requirements for pressurized die-casting, which helps to reduce substandard wall thickness of die-casting part 3, and improve the yield of die-casting part 3. Among them, solid breathable steel, hollow extruded sintered copper, or hollow breathable steel have better breathability and improve the yield of the die-casting parts better.

In particular, solid sintered copper is formed by sintering copper powder to melt and bonding the surface of the copper powder, such as solid round rods, which have good breathability. Hollow extruded forged aluminum is made by melting, pouring, and extruding aluminum, such as hollow aluminum rods, which have high strength and poor breathability. Hollow extruded sintered copper is formed by extruding copper powder into a hollow structure, such as a hollow round rod, and sintering to bond the copper powder, which has good breathability.

The positioning-filling rod 1 can be designed as a round rod or a special shape, and can be recycled after removing the sand core body 2.

The positioning-filling rod 1 can be designed into various sizes, so as to control the thickness of the sand core body 2. The sand core body 2 has a thickness of 10-20 mm, such as 10 mm, 15 mm, 20 mm, etc., at an end portion 201. The sand core body 2 with above thickness has both suitable breathability and strength, meeting the requirements for the die-casting process. When the thickness is too large, the risk of internal cracking increases, and the compressive strength also decreases. When the thickness is too small, the protection to the positioning-filling rod 1 is not enough, which is not conducive to the recycling of the positioning-filling rod 1 after repeated usage. The positioning-filling rod 1 is set in the sand core body 2, which saves the amount of sand used in the sand core. Moreover, the positioning-filling rod 1 can be recycled, thus the cost of the sand core structure is reduced.

In order to reduce the occurrence of gas pores, slag holes, and other defects during die-casting of die-casting part 3, it is an effective method to use the positioning-filling rod 1 made of breathable materials. The positioning and filling rod 1 with breathability is beneficial for discharging gas during the die-casting process, so as to avoid defects such as slag holes and gas pores inside the die-casting part 3, and substandard wall thickness of the die-casting part 3, thereby improving the yield. Further, the positioning-filling rod 1 can also has a protruding end configured to protrude from the sand core body 2, which can serve as an inflation inlet 101. Heptafluoropropane gas can be introduced through the inflation inlet 101 to removing air and reduce the probability of oxidation of the die-casting part 3. Heptafluoropropane also has flame retardant and fire extinguishing effects, which significantly reduces the possibility of sand cores (such as resin sand core) burning due to contact with high-temperature metal liquid.

When the positioning-filling rod 1 is made of solid aluminum or solid iron, although the cost is reduced and the strength meets the requirements for pressurized die-casting, discharging gas during die-casting process would be affected due to lack of breathability, which will lead to a large number of slag holes, gas pores, increased wall thickness and other defects inside the die-casting part 3, and low yield.

In some embodiments, the sand core body 2 has a thickness of 15 mm at an end portion 201, and the positioning-filling rod 1 is made of hollow breathable steel. After testing, the sand core body 2 with a thickness of 15 mm and a positioning-filling rod 1 made of hollow breathable steel can better reduce defects such as cold shut and significantly increase the yield, compared to the sand core body 2 with other wall thickness and a positioning-filling rod 1 made of other materials.

Example 2

Figure 3:
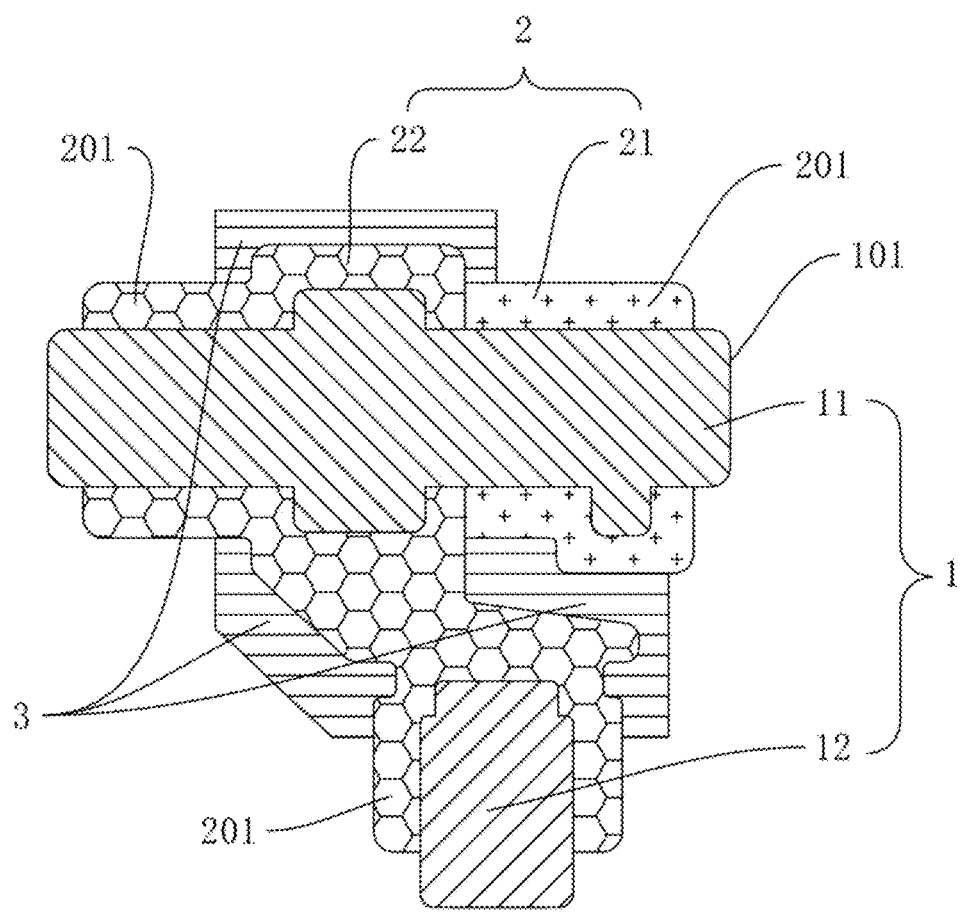
FIG. 3 is a cross-sectional view of another sand core structure for die-casting and die-casting part provided in Example 2.

As shown in FIG. 3, Example 2 provides a sand core structure for die-casting, including a positioning-filling rod 1 and a sand core body 2 configured to encompass the positioning-filling rod 1. Example 2 adopts the same technical solution as Example 1, except that the sand core body 2 includes a first core body 21, a second core body 22, a first rod 11, and a second rod 12.

Figure 4:
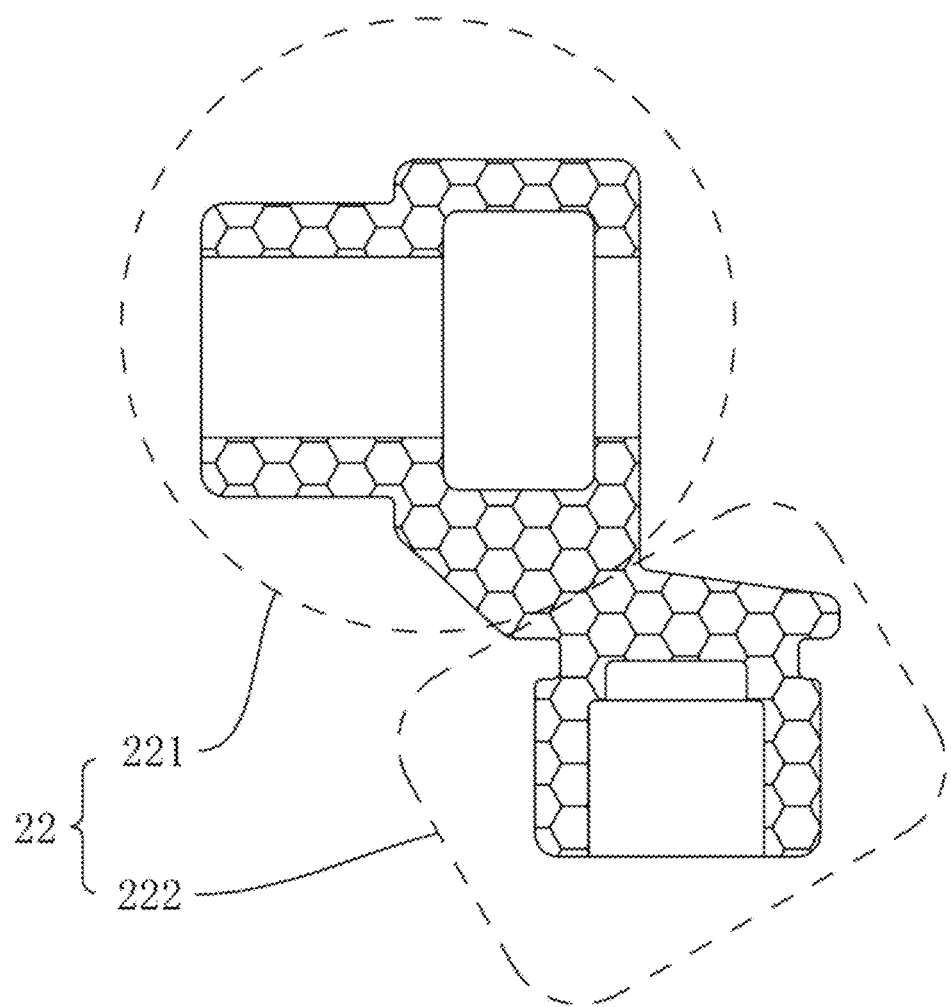
FIG. 4 is a cross-sectional view of a sand core body in the sand core structure of FIG. 3.

As shown in FIG. 4, the second core body 22 has an integrally formed main stem portion 221 and a branch portion 222. The main stem portion 221 and the branch portion 222 can be two forked structures of the second core body 22. The first rod 11 runs through the first core body 21 and the main stem portion 221, such that the first core body 21 is attached to the second core body 22. The second rod 12 is inserted in the branch portion 222. The setting of multiple positioning-filling rods and multiple sand core bodies can maintain the thickness of the sand core body within an appropriate range, such that the sand core structure has both high-strength and good breathability, which is also conducive to demolding. This design can achieve the preparation of die-casting parts 3 with branch structures.

Example 3

Figure 5:
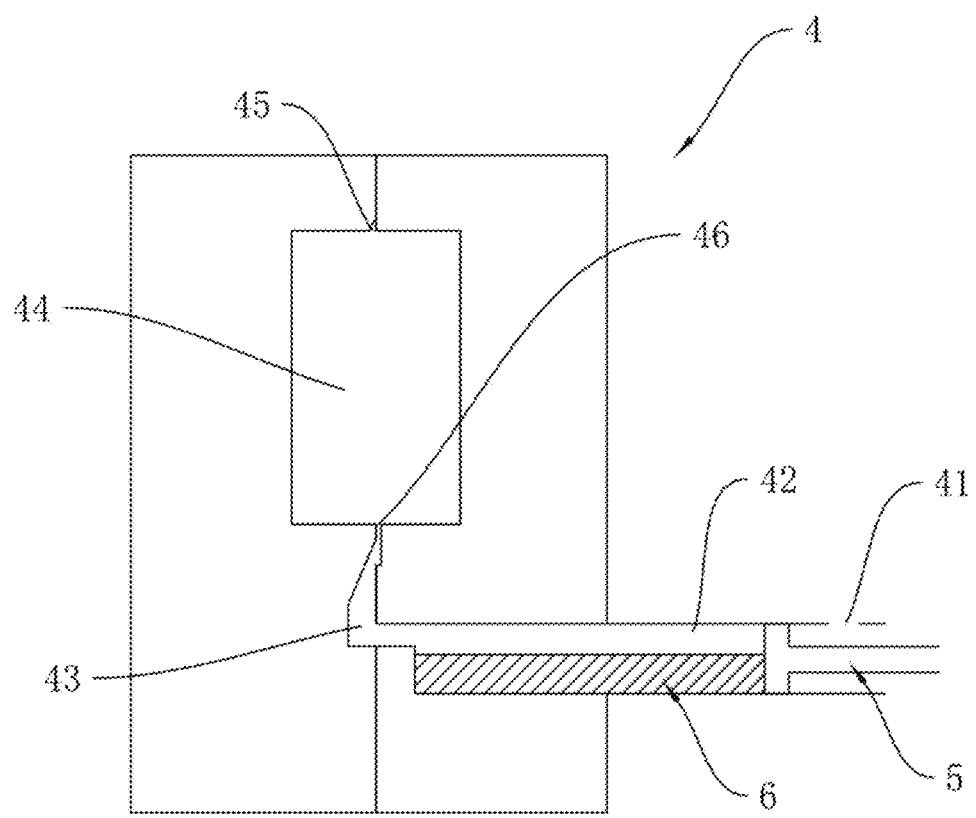
FIG. 5 is a schematic diagram of a die-casting mold provided in Example 3.

As shown in FIG. 5, a die-casting mold includes a sand core structure for die-casting in Example 2, a mold base 4 and an injection plunger 5. The positioning-filling rod 1 can be positioned in the mold base. The mold base includes a feeding inlet 41, an injection chamber 42 configured for accommodating metal liquid 6, a flow channel 43, a forming chamber 44, and a slag-gas outlet 45 successively connected. One end of the flow channel connected to the forming chamber is configured to be an inner gate 46. The inner gate 46 has a thickness of 0.5-2 mm; The sand core structure is installed in the forming chamber 44. The injection plunger 5 is movably embedded in the injection chamber 42.

When die-casting is performed using this die-casting mold, the air in the forming chamber 44 can be removed first, and then the heptafluoropropane gas can be filled, allowing the heptafluoropropane gas to fill the positioning-filling rod 1 and the sand core body 2, and then fill the entire forming chamber 44 to replace the air and other gases in the forming chamber 44. Then, metal liquid 6, such as aluminum liquid, can be injected. This die-casting mold can reduce the back pressure inside the forming chamber 44 during die-casting (the pressure that points back to the feeding inlet 41 after the internal pressure of the forming chamber 44 is increased), thereby effectively controlling the wall thickness of the die-casting part 3, reducing the gas pores formed inside the die-casting part 3 due to contact of the sand core (such as resin sand core) with a large amount of gas generated by high-temperature metal liquid 6 (such as aluminum liquid), and improving the surface smoothness of the inner cavity and mechanical properties of the casting parts. Compared to solid or hollow sand cores without the positioning-filling rod 1, the yield of the die-casting parts 3 prepared using this die-casting mold is significantly improved.

Example 4

Example 4 provides a die-casting molding process. A bend type die-casting part 3 used for a robot is made, and the designed wall thickness of each die-casting part 3 varies from 2.0 to 4.5 mm By adopting an improved sand core structure and die-casting molding process, the requirements for pressurized die-casting can be met, so that the quality of the die-casting part 3 can be improved, including improving the surface smoothness of the inner cavity, dimensional accuracy of the die-casting part 3, and reducing porosity of the die-casting part 3.

The die-casting mold of Example 3 is used in Example 4 for die-casting. Dongyang 350T die-casting machine is used, a metal liquid 6 is aluminum liquid at 660-670° C., and a temperature of the die-casting mold is 280-290° C.

The die-casting molding process includes an inflation stage, an initial stage, an injection chamber 42 stage, an inner gate 46 stage, a mold filling stage, and a compaction stage.

In the inflation stage, the die-casting mold is first vacuumed, and then the heptafluoropropane gas is filled into the inflation inlet 101 of the positioning-filling rod 1 for 3 seconds. The positioning-filling rod 1 and the sand core body 2 are filled with heptafluoropropane gas sequentially, and then the forming chamber 44 is filled with heptafluoropropane gas. After inflation, an air pressure in the forming chamber 44 is 0.3 MPa.

In the initial stage, a metal liquid 6 is pushed by the injection plunger 5 through the feeding inlet 41 at a first speed of 0.08 m/s.

In the injection chamber 42 stage, the metal liquid 6 is pushed by the injection plunger 5 to fill the injection chamber 42 at a second speed of 0.12-0.18 m/s.

In the inner gate 46 stage, the metal liquid 6 is pushed by the injection plunger 5 to fill the inner gate 46 at a third speed of 0.16-0.28 m/s.

During the filling stage, the metal liquid 6 is pushed by the injection plunger 5 to fill the forming chamber 44 at a fourth speed of 0.26-0.30 m/s.

In the compaction stage, when the metal liquid 6 is poured into the slag-gas outlet 45, the injection plunger 5 is activated to pressurize the metal liquid 6 in the forming chamber 44, and filling metal liquid and cooling is performed.

Different injection speeds in four stages are set during the die-casting process, which helps to eliminate cavity bubbles, prevent gas entrapment, improve poor die-casting phenomena such as pores and cold shut, and improve the yield of the die-casting parts. The die-casting molding process is a pressurized die-casting process, by which workpieces with a wall thickness of less than 3 mm at some portion and workpieces with non-uniform thickness can be prepared. Due to the use of a sand core inserted with a positioning-filling rod 1, the sand core has strong resistance to high-speed and high-pressure impact of molten metal, the die-casting defects are significantly reduced, and the yield of the die-casting parts is improved.

The impact of the first speed on the yield of the die-casting parts is relatively small. The impact of the second speed, third speed, fourth speed, pressurization timing during the compaction stage, the thickness of the end portion 201 of the sand core body 2, and the material of the positioning-filling rod 1 on the yield of the die-casting parts are verified.

For the fourth speed, third speed, and second speed, the cases of 0.26, 0.16, and 0.12 m/s, respectively; 0.28, 0.18, and 0.14 m/s, respectively; 0.30, 0.28, and 0.18 m/s, respectively, are verified.

For the timing of pressurization in the compaction stage, when the metal liquid 6 is poured into the slag-gas outlet 45, the injection plunger 5 is activated to pressurize the metal liquid 6 in the forming chamber 44, and filling metal liquid and cooling is performed. In this machine and mold, when liquid metal 6 is just poured into the slag-gas outlet 45, a corresponding parameter of a "pressurization switching position" in the machine is 315 mm, which is the stroke position of the injection plunger 5. The cases that the corresponding parameters of the "pressurization switching position" are 315 mm, 323 mm, and 331 mm, respectively, are verified.

For thickness of the sand core body 2 at the end portion 201, the thickness of 10 mm, 15 mm, and 20 mm, are tested respectively.

For the material of positioning-filling rod 1, the cases of solid breathable steel, solid sintered copper, solid gypsum, hollow extruded forged aluminum, hollow extruded sintered copper, and hollow breathable steel are verified.

The above four validation factors (material of positioning-filling rod, thickness of the sand core body at the end portion 201, pressurization switching position, and injection speed) are summarized in Table 1.

TABLE 1

Validation Factors and Factor Levels Table

| | Factor | | | |
|---|---|---|---|---|
| Level | Materials of the positioning-filling rod | Thickness of the sand core body at the end portion (mm) | Pressurization switching position (mm) | The fourth speed, the third speed, and the second speed (m/s) |
| 1 | Solid breathable steel | 10 | 3151 | 0.26, 0.16, 0.12 |
| 2 | Solid sintered copper | 15 | 323 | 0.28, 0.18, 0.14 |
| 3 | Solid gypsum | 20 | 331 | 0.30, 0.28, 0.18 |
| 4 | Hollow extruded forged aluminum | | | |
| 5 | Hollow extruded sintered copper | | | |
| 6 | Hollow breathable steel | | | |

For the four important influencing factors that affect the yield described above, Taguchi orthogonal validation was conducted, as shown in Table 2. An optimal example was obtained by calculating based on the data obtained from die-casting validation.

TABLE 2

Orthogonal experiment of four factors affecting the yield

| Test | Materials of the positioning-filling rod | Thickness of the sand core body at the end portion (mm) | Pressurization switching position (mm) | The fourth speed, the third speed, and the second speed (m/s) | Average thickness of the die-casting parts (mm) | Yield (%) |
|---|---|---|---|---|---|---|
| 1 | Solid breathable steel | 10 | 315 | 0.26, 0.16, 0.12 | 4.08 | 56 |
| 2 | Solid breathable steel | 15 | 323 | 0.28, 0.18, 0.14 | 4.11 | 68 |
| 3 | Solid breathable steel | 20 | 331 | 0.30, 0.28, 0.18 | 4.16 | 62 |
| 4 | Solid sintered copper | 10 | 315 | 0.28, 0.18, 0.14 | 4.08 | 45 |
| 5 | Solid sintered copper | 15 | 323 | 0.30, 0.28, 0.18 | 4.12 | 46 |
| 6 | Solid sintered copper | 20 | 331 | 0.26, 0.16, 0.12 | 4.19 | 42 |
| 7 | Solid gypsum | 10 | 323 | 0.26, 0.16, 0.12 | 4.14 | 31 |
| 8 | Solid gypsum | 15 | 331 | 0.28. 0.18. 0.14 | 4.20 | 33 |
| 9 | Solid gypsum | 20 | 315 | 0.30, 0.28, 0.18 | 4.25 | 36 |
| 10 | Hollow extruded forged aluminum | 10 | 331 | 0.30, 0.28, 0.18 | 4.10 | 35 |
| 11 | Hollow extruded forged aluminum | 15 | 315 | 0.26, 0.16, 0.12 | 4.13 | 39 |
| 12 | Hollow extruded forged aluminum | 20 | 323 | 0.28, 0.18, 0.14 | 4.17 | 41 |
| 13 | Hollow extruded sintered copper | 10 | 323 | 0.30, 0.28, 0.18 | 4.08 | 70 |
| 14 | Hollow extruded sintered copper | 15 | 331 | 0.26, 0.16, 0.12 | 4.11 | 76 |

TABLE 2-continued

Orthogonal experiment of four factors affecting the yield

| Test | Materials of the positioning-filling rod | Thickness of the sand core body at the end portion (mm) | Pressurization switching position (mm) | The fourth speed, the third speed, and the second speed (m/s) | Average thickness of the die-casting parts (mm) | Yield (%) |
|---|---|---|---|---|---|---|
| 15 | Hollow extruded sintered copper | 20 | 315 | 0.28, 0.18, 0.14 | 4.16 | 74 |
| 16 | Hollow breathable steel | 10 | 331 | 0.28, 0.18, 0.14 | 4.07 | 76 |
| 17 | Hollow breathable steel | 15 | 315 | 0.30, 0.28, 0.18 | 4.09 | 78 |
| 18 | Hollow breathable steel | 20 | 323 | 0.26, 0.16, 0.12 | 4.13 | 80 |

The casting parts obtained in Table 2 have an average wall thickness of 4.07-4.25 mm, and have a wall thickness of is 2-3 mm at some parts of the casting parts.

Figure 6:
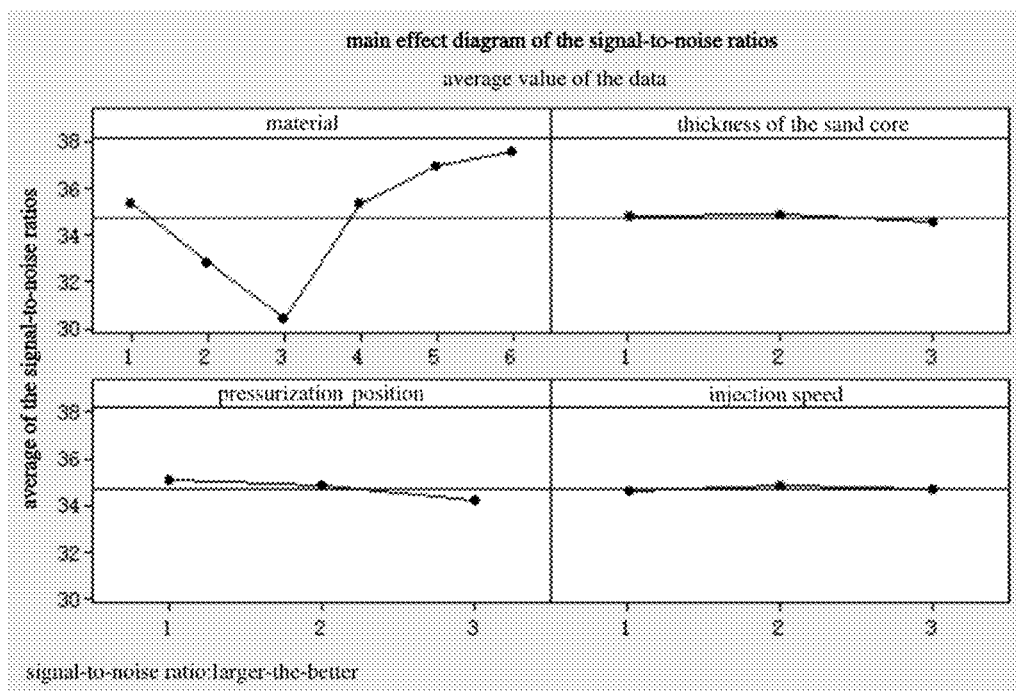
FIG. 6 is a main effect diagram of the signal-to-noise ratio of each factor provided in Example 4.
Figure 7:
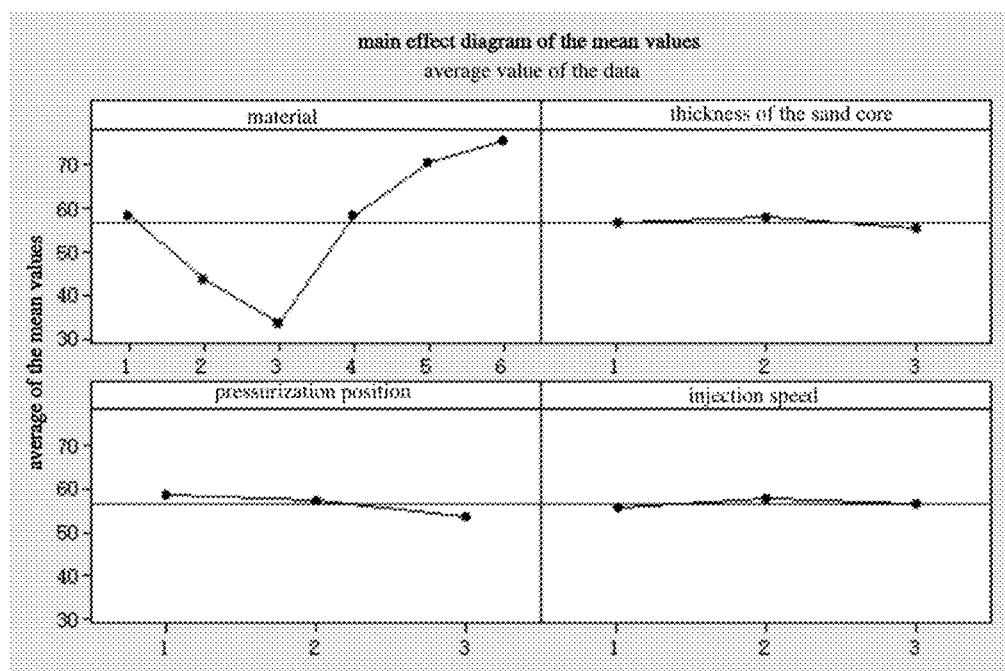
FIG. 7 is the main effect diagram of the mean values of each factor provided in Example 4.

After the experiment, the signal-to-noise ratio response table for each factor were obtained, as shown in Table 3 and FIG. 6, and the mean value response table for each factor were obtained, as shown in Table 4 and FIG. 7. Data and effect graph were analyzed.

TABLE 3

Response Table of Signal to Noise Ratio of Various Factors
Mean value response table
Larger-the-better

| Level | Materials | Thickness of the sand core | Pressurization position | Injection speed |
|---|---|---|---|---|
| 1 | 35.29 | 34.74 | 35.07 | 34.60 |
| 2 | 32.79 | 34.88 | 34.89 | 34.84 |
| 3 | 30.44 | 34.55 | 34.21 | 34.73 |
| 4 | 35.31 | | | |
| 5 | 36.94 | | | |
| 6 | 37.57 | | | |
| Delta | 7.13 | 0.33 | 0.86 | 0.24 |
| Rank | 1 | 3 | 2 | 4 |

For Table 3 and FIG. 6, the Taguchi signal-to-noise ratio analysis is conducted as follows.

The order of notable factors: material>pressurization position>thickness of sand core>injection speed. Among them, the order of notable factors is determined based on the amplitude of changes in the signal-to-noise ratio of each factor in Table 3, or the amplitude of changes in each curve in FIG. 6.

The optimal combination of factors: the material is hollow breathable steel, the pressurization switching position is 315 mm, the thickness of the sand core body 2 is 15 mm, and the injection speeds are: 0.28 m/s for the fourth speed, 0.18 m/s for the third speed, and 0.14 m/s for the second speed. The optimal factor is determined by selecting the level value with the highest signal-to-noise ratio for each factor, corresponding to the parameters in Table 1.

TABLE 4

Mean Response Table of Various Factors
Mean value response table

| Level | Materials | Thickness of the sand core | Pressurization position | Injection speed |
|---|---|---|---|---|
| 1 | 58.33 | 56.67 | 58.67 | 55.83 |
| 2 | 43.67 | 57.83 | 57.50 | 57.67 |
| 3 | 33.33 | 55.33 | 53.67 | 56.33 |
| 4 | 58.33 | | | |
| 5 | 70.33 | | | |
| 6 | 75.67 | | | |
| Delta | 42.33 | 2.50 | 5.00 | 1.83 |
| Rank | 1 | 3 | 2 | 4 |

For Table 4 and FIG. 7, the Taguchi signal-to-noise ratio analysis was conducted as follows.

The order of notable factors: material>pressurization position>thickness of sand core>injection speed.

The optimal combination of factors: the material is hollow breathable steel, the pressurization switching position is 315 mm, the thickness of the sand core body 2 is 15 mm, and the injection speeds are: 0.28 m/s for the fourth speed, 0.18 m/s for the third speed, and 0.14 m/s for the second speed.

The inferred optimal combination of factors was introduced into the validation and designated as test 19. Die-casting production validation was conducted under the same machine and conditions, and the obtained yield was 85%, which is higher than that of tests 1-18 in Table 2.

Test 20 was conducted, in which the thickness of sand core body 2 was 20 mm, and other test conditions were same as test 19. The yield of the die-casting parts obtained is 82%, which is lower than the yield of the die-casting parts in test 19.

In tests 16, 17, and 18, the surface smoothness of the inner cavity of die-casting part 3 obtained from the tests were Ra25-Ra12.5.

Tests 21, 22, and 23 were conducted by changing tests 16, 17, and 18, respectively. Specifically, in tests 21, 22, and 23, the inflation stage was not conducted, that is, the mold was not vacuumed and heptafluoropropane gas was not filled. Other test conditions were the same, and after die-casting, the surface smoothness of the inner cavity of die-casting part 3 were all Ra50.

Figure 8:
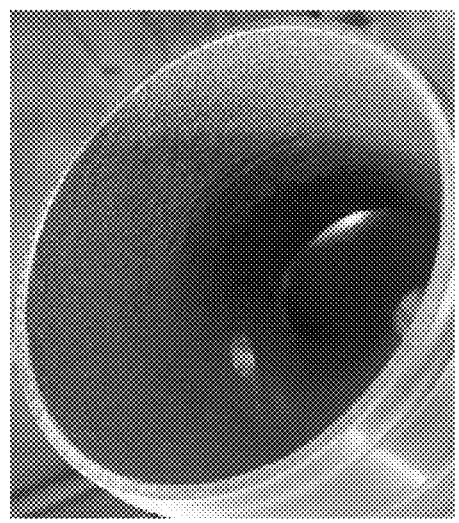
FIG. 8 is a comparison of the smoothness of the inner cavity of a die-casting part obtained by die-casting process using a solid sand core not filled with heptafluoropropane gas, and a die-casting part obtained by die-casting process using a sand core inserted with a positioning-filling rod and filled with heptafluoropropane gas provided in Example 4.
Figure 8:

As shown in FIG. 8, A shows a die-casting part prepared without injecting heptafluoropropane gas in test 22, and the inner cavity surface of the die-casting part was relatively rough. B shows a die-casting part prepared in test 17. In test 17, before die-casting, the forming chamber 44 was first vacuumed, and then heptafluoropropane gas was filled. The positioning-filling rod 1 and the sand core body 2 were filled with heptafluoropropane gas, and then the entire forming chamber 44 were filled with heptafluoropropane gas to replace the air and other gases in the cavity. Then, liquid metal 6 was injected to prepare the die-casting part. The B shows that the inner cavity surface of the die-casting part was relatively smooth.

The experiment shows that filling of heptafluoropropane gas before die-casting reduces the probability of oxidation of die-casting parts and improves the surface smoothness of the inner cavity of the die-casting parts.

In summary, the breathability of material of the positioning-filling rod 1, the Pressurization switching position, the thickness of the sand core body 2, and the injection speed all affect the wall thickness accuracy and yield of the die-casting parts 3. The sand core structure and die-casting molding process designed in the example have the effect of reducing internal slag holes and gas pores in die-casting part 3, improving the wall thickness accuracy of die-casting part 3 and surface smoothness of the inner cavity of die-casting part 3, and significantly improving the yield.

The above are only the preferred embodiments of the present application, and the protection scope of the present application is not limited to the above embodiments. It is anticipated that, upon reading the specification, those skilled in the art can make modifications and variations to the embodiment based on needs without paying any creative contribution, which, as long as falling within the scope of the present application.

LIST OF REFERENCE MARKS 1. positioning-filling rod
2. sand core body
201. end portion
3. die-casting part
101. inflation inlet
21. first core body
22. second core body
221. main stem portion
222. branch portion
11. first rod
12. second rod
4. mold base
5. injection plunger
6. metal liquid
41. feeding inlet
42. injection chamber
43. flow channel
44. forming chamber
45. slag-gas outlet
46. inner gate

What is claimed is:

1. A sand core structure for die-casting, the sand core structure comprising a positioning-filling rod and a sand core body configured to encompass the positioning-filling rod, wherein the positioning-filling rod has a compressive strength greater than a compressive strength of the sand core body, and the positioning-filling rod is made of a breathable material;
   wherein the positioning-filling rod is made of materials selected from a group consisting of solid breathable steel, hollow extruded sintered copper, and hollow breathable steel; and
   wherein the positioning-filling rod has a protruding end configured to protrude from the sand core body, and the protruding end is configured to be an inflation inlet for heptafluoropropane gas.

2. The sand core structure for die-casting according to claim 1, wherein the sand core body has a thickness of 10-20 mm at an end portion.

3. The sand core structure for die-casting according to claim 2, wherein the sand core body has a thickness of 14-16 mm at the end portion.

4. The sand core structure for die-casting according to claim 1, wherein the positioning-filling rod comprises a first rod and a second rod, the sand core body comprises a first core body and a second core body, the second core body has an integrally formed main stem portion and a branch portion, the first rod runs through the first core body and the integrally formed main stem portion, the first core body is attached to the second core body, and the second rod is inserted in the branch portion.

* * * * *